United States Patent
Nierobisch et al.

(10) Patent No.: US 9,102,352 B1
(45) Date of Patent: Aug. 11, 2015

(54) METHOD AND DEVICE FOR COMPENSATING FAULT IN AN ELECTRICAL STEERING SYSTEM

(71) Applicant: ZF LENKSYSTEME GMBH, Schwaebisch Gmuend (DE)

(72) Inventors: Thomas Nierobisch, Leinzell (DE); Stefan Gruener, Auenwald (DE); Tomas Hrycej, Lorch (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 0 days.

(21) Appl. No.: 14/312,032

(22) Filed: Jun. 23, 2014

Related U.S. Application Data

(63) Continuation of application No. PCT/EP2012/076080, filed on Dec. 19, 2012.

(30) Foreign Application Priority Data

Jan. 13, 2012 (DE) .......................... 10 2012 100 276
May 16, 2012 (DE) .......................... 10 2012 104 253

(51) Int. Cl.
 B62D 5/04 (2006.01)
(52) U.S. Cl.
 CPC ................... B62D 5/0472 (2013.01)
(58) Field of Classification Search
 CPC ..................................................... B62D 5/0472

USPC ........................................................... 701/41
See application file for complete search history.

(56) References Cited

U.S. PATENT DOCUMENTS

| | | |
|---|---|---|
| 2006/0015226 A1 | 1/2006 | Bernzen et al. |
| 2012/0004807 A1 | 1/2012 | Hales et al. |
| 2013/0124048 A1 | 5/2013 | Gruener et al. |

FOREIGN PATENT DOCUMENTS

| | | |
|---|---|---|
| DE | 102 35 039 | 2/2004 |
| DE | 10 2008 056 472 | 11/2009 |
| DE | 10 2009 028 448 | 5/2011 |
| DE | 10 2009 047 586 | 6/2011 |
| DE | 10 2010 031 211 | 1/2012 |
| EP | 2 402 234 | 1/2012 |

*Primary Examiner* — Mary Cheung
*Assistant Examiner* — Anne Mazzara
(74) *Attorney, Agent, or Firm* — Jordan and Hamburg LLP

(57) ABSTRACT

In an electric steering device, a plurality of periodic disturbances ($M(f_{1o})$, $M(f_{2o})$, ... $M(f_{no})$) can occur which are to be compensated, while additionally occurring, in particular non-periodic, disturbances ($M_{stoer}$) are not to be compensated. So as to enable simultaneous compensation of a plurality of such periodic disturbances based on a model ($G_{nom}(s)$) of the steering device, it is proposed to map the further disturbances $M_{stoer}$ occurring in addition to the disturbances $M(f_{1o})$, $M(f_{2o})$, ($Mf_{no}$) to be compensated, together with inaccuracies or modeling errors ($\Delta s$) of the model ($G_{nom}(s)$) in the form of an unstructured disturbance ($\underline{M}_{stoer}$).

9 Claims, 4 Drawing Sheets

Fig. 3

METHOD AND DEVICE FOR COMPENSATING FAULT IN AN ELECTRICAL STEERING SYSTEM

BACKGROUND OF THE INVENTION

The invention relates to a method for simultaneously compensating for a plurality of periodic, in particular sinusoidal, disturbances occurring during the operation of an electric steering system, wherein the electric steering system comprises a torque control element, and wherein at least one compensation signal corresponding to the disturbances that are to be compensated for is determined as a function of a signal characterizing an actuating torque of the torque control element and a signal characterizing a current torsion bar torque, using a model of the steering system.

The invention further relates to a device for simultaneously compensating for a plurality of periodic, in particular sinusoidal, disturbances occurring during the operation of an electric steering system, wherein the electric steering system comprises a torque control element, and wherein at least one compensation signal corresponding to the disturbances that are to be compensated for can be determined as a function of a signal characterizing an actuating torque of the torque control element and a signal characterizing a current torsion bar torque, using a model of the steering system.

A method and a device for detecting and compensating for torsional steering wheel vibrations in an EPS steering system are known from DE 10 2009 028 448 A1. A variable-frequency disturbance and state variable calculator is provided for the compensation of the torsional steering wheel vibrations. If the presence of a disturbance frequency is detected, the variable-frequency disturbance and state variable calculator is activated. This calculator calculates an additional motor torque, which is suitable, in terms of the amplitude, frequency and phase position thereof, for compensating for the detected dominant disturbance frequency, as a function of the previously ascertained dominant disturbance frequency, a torsion bar torque filtered through a variable-frequency bandpass filter, and optionally further measured variables. The bandpass filter is required because the model of a system to be observed, which is implemented in the disturbance and state variable calculator, cannot be determined with sufficient precision across a large frequency range.

While the known method allows sufficiently good compensation for torsional steering wheel vibrations that are caused by sinusoidal disturbance frequencies for many applications, the implementation of the method requires relatively high computing power, among other things due to the complex filtering of the input signal.

Moreover, only a single sinusoidal disturbance can be compensated for by way of the known method. However, there are also situations in which it is not sufficient to compensate for a single sinusoidal disturbance frequency. For example, first- and second-order periodic vibrations occur as a result of the brake disk geometry with what is known as cold brake judder, and fifth- to tenth-order vibration forms even occur with what is known as hot brake judder. However, simultaneous compensation of multiple periodic disturbing signals is no trivial task. Analyses have shown that an enhancement of a disturbance and state variable calculator becomes too unstable with the presence of two periodic disturbing signals, which each are appropriately filtered using a bandpass filter, due to resulting different propagation times or phases of the signals, and that compensation of the disturbing signals is no longer possible due to the creation of inadvertent interactions.

Moreover, disturbance variable calculators have the fundamental problem that modeling errors or inaccuracies in the model of the controlled system, which is an integral part of the disturbance variable calculator, are mapped in the disturbance variable that is ascertained or reconstructed by way of the disturbance variable calculator (the variable, in turn, being decisive in the creation of the compensation signal). This problem is further intensified when the disturbance to be compensated for is defined for a particular structure or for a sinusoidal signal. Without the use of a bandpass filter on the input side, all disturbances acting on the input side and the modeling errors of the controlled system would act in the form of an offset on the compensation signal ascertained by way of the disturbance variable calculator, which, in turn, would be perceived by the driver as a constant offset moment or holding moment at the steering wheel.

SUMMARY OF THE INVENTION

Therefore, it is the object of the present invention to allow for compensation of disturbances in an electric steering system, allowing multiple, simultaneously occurring, periodic disturbances to be compensated for. In particular, compensation of disturbances caused by cold brake judder and hot brake judder is to be made possible. Periodic, and in particular sinusoidal, disturbances shall be understood to mean not only signals having the form $y(t)=A \times \sin(2p \times f \times t)$, but also, for example, signals having the form $y(t)=A(t) \times \sin(2p \times f(t) \times t)$, in which the amplitude $A(t)$ and the frequency $f(t)$ change over time, and in particular also signals having the form $y(t)=A_1(t) \times \sin(2p \times f_1(t) \times t) + A_2(t) \sin(2p \times f_2(t) \cdot t)$, wherein $f_1(t)$ and $f_2(t)$ are of different orders (for example, $f_2(t)$ is the second order of $f_1(t)$). Periodic disturbances should thus also comprise those signals in which the amplitude of the vibration and the frequency thereof (in particular due to a temporal change of the delay) can change temporally. Disturbances that represent a superposition of two or more frequencies (in particular if a second frequency represents a higher order of the first frequency) shall be understood by the term "periodic disturbance" in the present invention.

Further advantageous embodiments will be apparent based on the features described in the following description.

The invention initially is based on a system that is suitable for compensating for a single periodic (sinusoidal, for example) disturbance occurring during the operation of an electric steering system, in which a compensation signal, which corresponds to the periodic disturbance to be compensated for, is formed as a function of a signal characterizing an actuating torque of a torque control element and a signal characterizing a current torsion bar torque, using a model of the steering system. Torsion bar torque in the present invention shall be understood to mean any torque that corresponds to a torsion bar torque with sufficient precision and that corresponds to the moment applied by the driver and acting between the driver and the pinion of the steering system. In particular, the torsion bar torque does not necessarily have to be detected by way of a torque sensor that is disposed on the torsion bar, but can be detected by way of other sensors and/or calculated, for example as a function of a current motor torque.

A possible starting system of the invention is the system described above and known from DE 10 2009 028 448 A1, for example, however, this system does not allow simultaneous compensation of multiple disturbances or of higher-order disturbances for the reasons described above. There, the disturbing signal is reconstructed, or the compensation signal is determined, in a functional unit, which represents a disturbance and state variable calculator.

According to the invention, it is now proposed to collectively map additionally occurring disturbances, and in particular unstructured disturbances, and modeling errors or inaccuracies between the model of the steering system and the actual steering system, in the form of an unstructured disturbance. Thus both the modeling errors, or the deviations of the modeled system from the actual controlled system, which is to say the actual steering system, and unstructured disturbances that do not correspond to the disturbances to be compensated, will not influence, the compensation signal, and thus the actuating torque that is generated as a function of the compensation signal and supplied to the torque control element, in an interfering manner. According to the invention, thus all signal components that correspond neither to the (reconstructed) torsion bar torque nor to the reconstructed disturbances, or the generated compensation signals, are mapped in a variable, which can thus be considered an additional unstructured disturbance having low dynamics.

In principle, disturbance and state calculators, also referred to as "observers," have proven useful for ascertaining torsional steering wheel vibrations. As was already set out above, however, the known disturbance and state calculators are not suitable for compensating for higher-order periodic vibrations (disturbances) and for compensating for a plurality of simultaneously occurring disturbances. Another problem is that existing modeling errors or inaccuracies in the model of the controlled system (as a result of production variances, for example) are mapped in the estimated disturbance, which, in turn, forms the basis for creating the compensation signals. Without the use of the above-mentioned bandpass filter, all disturbances that occur and the modeling errors are therefore mapped onto the structured disturbance, which results in an offset in the compensation signal that is formed, which, in turn, is perceived at the steering wheel as a constant offset moment or holding moment. According to a particularly preferred embodiment, the determination of the additional unstructured disturbance is therefore carried out in a functional unit, which hereinafter is referred to as a disturbance and state calculator having an additional unstructured disturbance ("SZB+uS") and in which the unstructured disturbances that occur are mapped together with the modeling errors in a shared variable in the form of an additional unstructured disturbance. It is thus achieved that, of all the disturbing signals that occur, only the sinusoidal disturbances that are to be compensated for are used to ascertain the compensation signals. Since further disturbances are not considered in the creation of the compensation signals, the unstructured disturbance or an error in the model of the controlled system cannot negatively influence the compensation of the disturbances.

According to an advantageous embodiment, the additional unstructured disturbance is implemented as a prediction filter, which maps onto the unstructured disturbance the deviations or the difference between the predicted system states, which are ascertained based on the system model, and the predicted system state, which is ascertained using the measured variable and the currently estimated disturbance variables.

Moreover, it may be provided that the steering system comprises a torque control element, which can be actuated by a steering controller of the steering system, for example, and that the disturbance and state calculator having an additional unstructured disturbance is directly supplied a variable generated by the steering controller as an input variable. The disturbance and state calculator having an additional unstructured disturbance thus receives the variable generated by the steering controller directly, which is to say without any preprocessing, such as the bandpass filtering provided for in the methods known from DE 10 2009 028 448 A1. Since the preprocessing, in particular the filtering, can be dispensed with, the method can be implemented with low complexity. For example, the actuating torque can be a torque that is applied to the torsion bar of the steering system by the torque control element.

In principle, actuating torques that are modified according to the invention can be used to compensate for disturbances in the torsion bar torque, and thus the torsion bar can be stabilized with respect to the selected frequencies, which can result in an additional vibration of the rotor or of the rotor position signal at appropriate frequencies.

According to the invention, it is thus possible now to reconstruct disturbing signals and thereby generate compensation signals, which correspond to periodic disturbances having different orders. In this way, simultaneous compensation of multiple periodic disturbances, such as sinusoidal, disturbances is achieved. For each disturbance, a corresponding periodic disturbing signal or compensation signal can be ascertained. The individual periodic disturbances can be compensated for based on the ascertained periodic disturbing signals or compensation signals.

Torsional steering wheel vibrations caused by fluctuations in the thickness of a brake disk are compensated for as brake judder. As a result of the geometry of brake disks, first-order and second-order sinusoidal vibrations can primarily occur with cold brakes (so-called cold brake judder). When brakes have run hot, even higher-order sinusoidal vibrations, in particular fifth- to tenth-order sinusoidal vibrations can occur (so-called hot brake judder). It is now possible in particular to compensate for all types of brake judder by way of the method according to the invention and the device according to the invention.

Even if the input variable is supplied unfiltered the disturbance variable observer, for example without bandpass filtering, the disturbance variable observer can simultaneously generate respective associated periodic disturbing signals for all sinusoidal vibrations. Moreover, other types of torsional steering wheel vibrations, such as those originating from wheel imbalance (shimmy), can be compensated for by the device according to the invention and the method according to the invention.

The periodic, in particular sinusoidal, disturbances occurring in the steering system can be dependent on a wheel rotation frequency of the steering system, or of a wheel of the vehicle in which the steering system is installed. For example, the wheel rotation frequency can correspond to the fundamental frequency (first order) of the above-described sinusoidal vibrations. Accordingly, a rotational frequency of a wheel axle and/or of a wheel of the steering device, or a frequency derived from the rotational frequency, can be determined as the fundamental frequency. However, disturbances can also be generated by components of the steering system itself, for example by the electric motor (and there in particular by the rotor) which generates the motor torque for power assistance. In principle, such motor orders can also be compensated for by way of the proposed solution.

The device according to the invention can be an open-loop and/or closed-loop control unit of the steering system, for example. The device is configured to carry out the method according to the invention. In particular, it can be provided that the device comprises an arithmetic unit, preferably comprising a microprocessor and a memory element, wherein a computer program is stored in the arithmetic unit, preferably in the memory element, and the computer program is programmed so that the device carries out the method according to the invention, when the computer program is executed on the arithmetic unit.

Further features of the invention are provided in the following description of exemplary embodiments and in the drawings, wherein the features can be important for the invention both alone and in various combinations, without further explicit reference being made thereto.

BRIEF DESCRIPTION OF THE DRAWINGS

FIG. 3 is a differential equation to illustrate a possible mathematical description of a disturbance variable and state calculator having an additional unstructured disturbance according to the invention, according to one exemplary embodiment.

DESCRIPTION OF THE PREFERRED EMBODIMENTS

Figure 1:
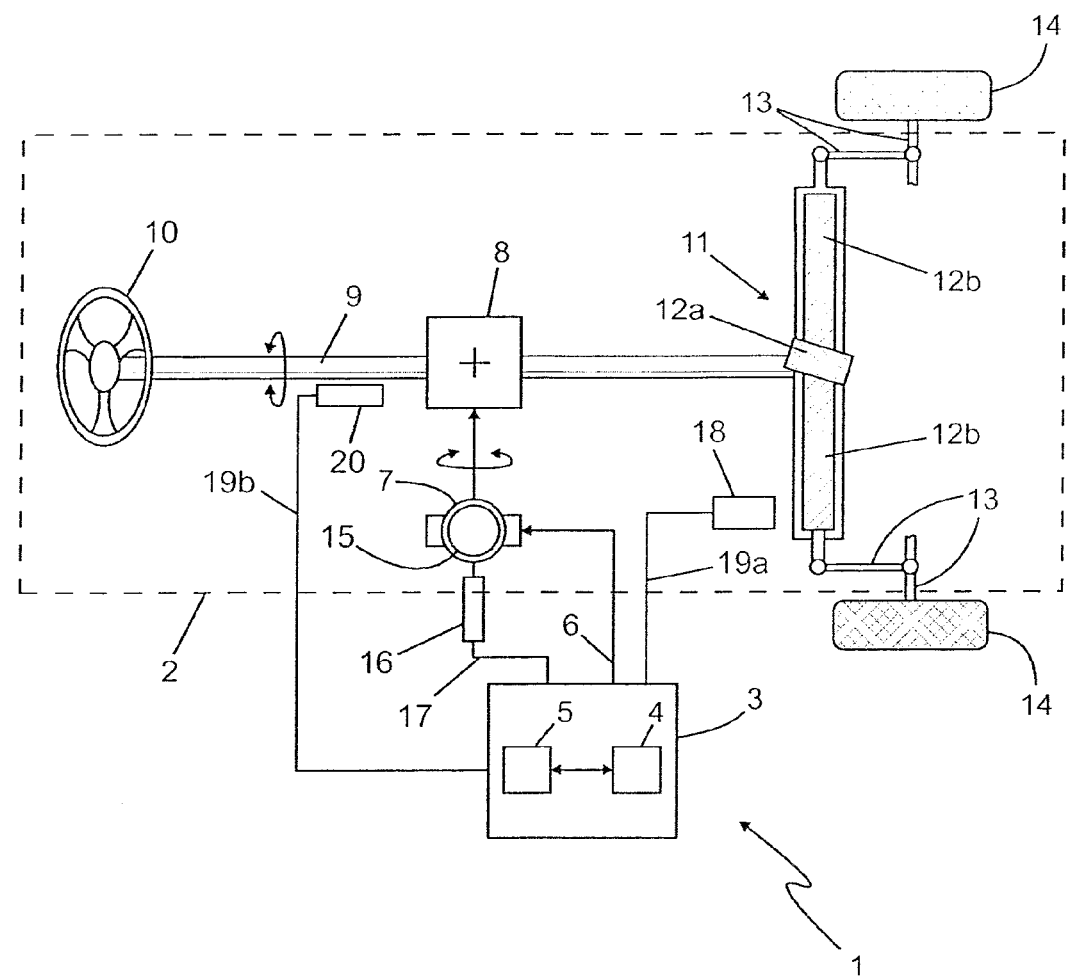
FIG. 1 is a schematic illustration of a steering system of a vehicle.

FIG. 1 shows a steering system 1, which comprises a steering device 2 and a control unit 3. A microprocessor 4, which is connected to a memory element 5 by way of a data line, such as a bus system, is disposed in the control unit 3. Memory areas, in which are stored functional means for carrying out the method according to the invention, for example in the form of a computer program, are formed in the memory element 5. Moreover, characteristic maps can be stored in the memory element 5.

The control unit 3 is connected to a torque control element 7, which is designed as an electric motor, for example, by way of a signal line 6, whereby control of the electric motor by the control unit 3 is made possible. The electric motor acts on a torsion bar 9 via a gearbox 8 so that the motor can exert an actuating torque on the torsion bar. A steering means, such as a steering wheel 10, is disposed on the torsion bar 9.

The steering device moreover comprises a steering gear 11, which is designed as a rack-and-pinion steering gear. The steering gear 11 is connected on each vehicle side to a steering linkage 13 by way of a pinion 12a and the steering rack 12b, each steering linkage cooperating with a wheel.

The torque control element 7 comprises a rotor 15. It may be provided that the current rotor position can be detected by way of a rotor position sensor 16. This position is supplied to the control unit 3 by way of a data line 17. As an alternative or in addition, the steering system 1 can comprise a rotor speed sensor, which is not shown.

Wheel speed can be detected by way of a speed sensor 18 and transmitted to the control unit 3 by way of a data line 19a. Current torsion bar torque can be detected by way of a torque sensor 20 and transmitted to the control unit 3 by way of a data line 19b.

The data lines 6, 17, 19a and 19b can be implemented in a variety of known designs. Preferably a bus system is employed for the communication between the control unit 3 and the sensors and/or actuators.

The method according to the invention can be carried out on the steering system shown in FIG. 1 by suitably programming the control unit 3.

Figure 2:
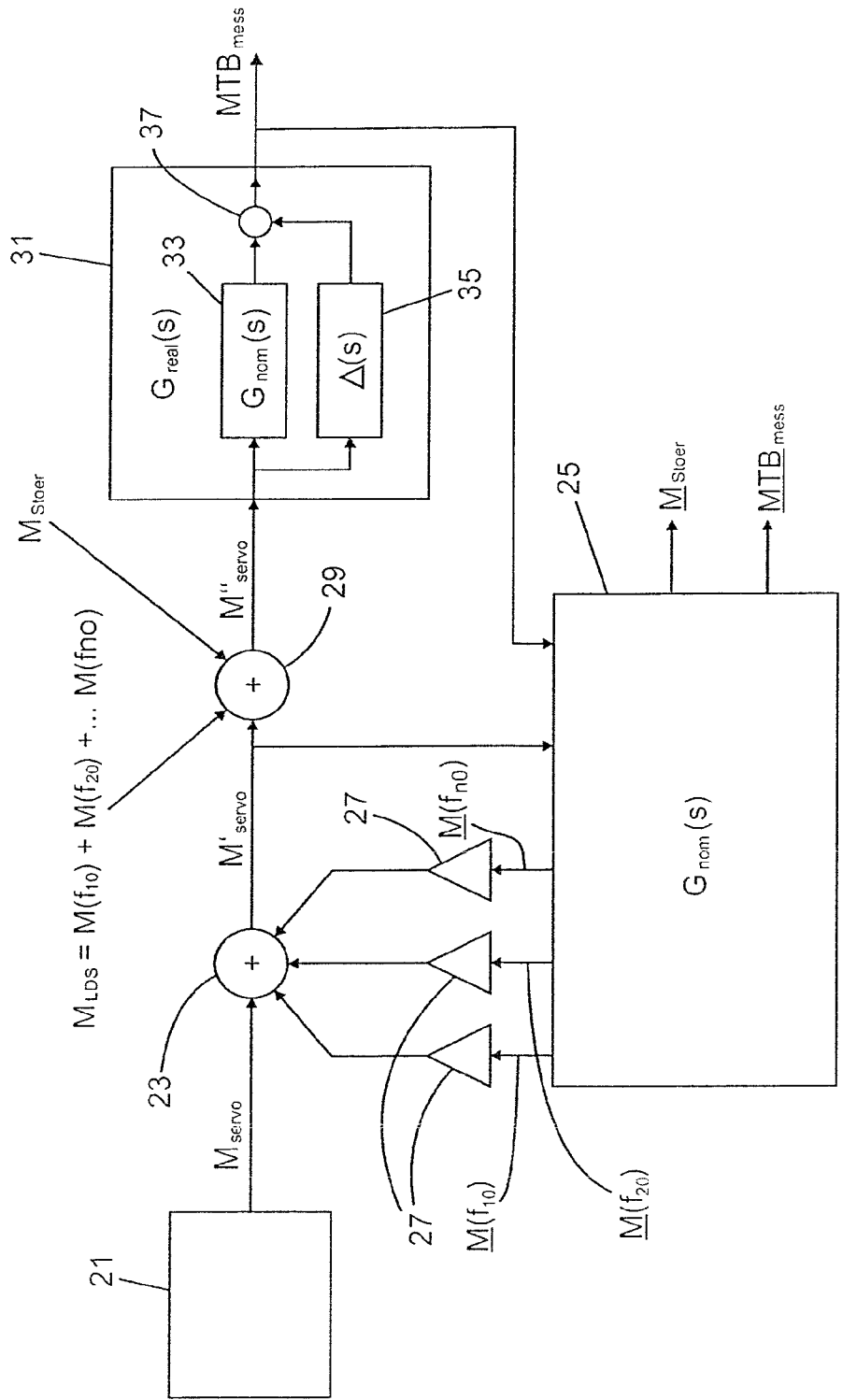
FIG. 2 is a block diagram of a control system comprising a disturbance variable and state calculator having an additional unstructured disturbance designed according to the invention, according to one possible embodiment of the invention.

FIG. 2 shows a block diagram, based on which a possible embodiment of the invention is hereafter shown, which allows disturbances, in particular first-order and/or second-order torsional steering wheel vibrations occurring in the steering system 1, to be compensated for. Moreover, it is even possible to compensate for torsional steering wheel vibrations of any order, which occur with hot brake judder, for example. FIG. 2 in particular illustrates the mode of operation of a variable-frequency and/or static-frequency disturbance variable and state calculator having an additional unstructured disturbance according to the invention, and the causal relationship thereof with the steering controller for power assistance, and external disturbances, as well as the controlled system or the steering system proper.

FIG. 2 shows a steering controller 21 which is implemented in a separate unit, however this is preferably implemented in the control unit 3 by way of suitable programming and which, as a function of measured and/or calculated input variables, calculates a signal $M_{servo}$ on which an actuation of the torque control element 7 or of the electric motor is based.

The signal $M_{servo}$ is fed to an adder 23, and an actuating torque $M'_{servo}$ is created. The actuating torque $M'_{servo}$ is used as an input variable for a calculation unit, which is preferably designed as a disturbance variable and state calculator having an additional unstructured disturbance 25. This variable-frequency and/or static-frequency disturbance variable and state calculator having an additional unstructured disturbance 25 is hereafter also referred to as a disturbance variable observer 25 or as "SZB+uS" 25. All estimates and/or reconstructions of external disturbances and all calculated internal steering states are shown with an underline in FIG. 2.

The disturbance variable observer 25 is used to reconstruct the actually present sinusoidal disturbances $M(f_{1o})$, $M(f_{2o})$, $M(f_{no})$ or to create the corresponding compensation signals $\underline{M}(f_{1o})$, $\underline{M}(f_{2o})$, ... $\underline{M}(f_{no})$. Moreover, a measured torsion bar torque $\underline{MTB}_{mess}$ is reconstructed, and all unstructured variables, together with the modeling errors that are present, are mapped in a further variable, which is referred to as the additional disturbance $\underline{M}_{stoer}$.

In the advantageous embodiment shown in FIG. 2, the actuating torque $M'_{servo}$ created from the signal $M_{servo}$ is supplied to the SZB+uS 25 as an input variable, without the signal $\underline{M}_{servo}$ being preprocessed for this purpose by way of an additional signal processing method, such as filtering.

The disturbance variable and state variable calculator having an additional unstructured disturbance 25 according to the invention is designed as a control engineering observer, such that both variable-frequency and stable-frequency disturbing signals, or corresponding disturbances $M(f_{1o})$, $M(f_{2o})$, $M(f_{no})$ of different orders can be compensated for. For this purpose, the sinusoidal disturbing signals $M(f_{1o})$, $M(f_{2o})$, ..., $M(f_{no})$ are reconstructed in the form of compensation signals $\underline{M}(f_{1o})$, $\underline{M}(f_{2o})$, $\underline{M}(f_{no})$. The frequency $f_{1o}$ (fundamental frequency) represents a first-order vibration (fundamental component), by way of example, the frequency $f_{2o}$ represents a second-order vibration, and the frequency $f_{no}$ represents an n-th order vibration (harmonics). The method according to the invention can accordingly be used to compensate for differing sinusoidal disturbances of differing orders. The method according to the invention is, of course, also suitable for compensating for only one first-order (n=1) sinusoidal disturbance $M(f_{1o})$ by generating and adding a corresponding compensation signal $\underline{M}(f_{1o})$.

The calculated compensation signals $\underline{M}(f_{1o})$, $\underline{M}(f_{2o})$, ..., $\underline{M}(f_{no})$ are multiplied with a factor by way of separate scaling elements 27 and then fed to the first adder 23. The value −1 can be selected as the factor, for example, so that the first adder 23 superimposes the compensation signals $\underline{M}(f_{1o})$, $\underline{M}(f_{2o})$, ... $\underline{M}(f_{no})$ on the signal $M_{servo}$, whereby the actuating torque $M'_{servo}$ is created.

If torsional steering wheel vibrations or periodic disturbances $M_{LDS}$ of a first order $M(f_{1o})$, second order $M(f_{2o})$ and/or higher order $M(f_{no})$ now occur in the control system shown by way of example in FIG. 2, which are caused by an imbalance of a wheel 14 (shimmy) or thickness fluctuations of a brake disk (brake judder), for example, these disturbances influence the actuating torque $M'_{servo}$, whereby a signal $M''_{servo}$ is created. This is illustrated by way of example by an adder 29 in FIG. 2. Of course, the disturbances can just as well be recorded on the output side, which is to say together with the measured torsion bar torque ($MTB_{mess}$).

FIG. 2 further shows a schematic illustration of a steering device 31 in the form of a functional block. The steering device 31 can be regarded as a transfer function $G_{real}(s)$, by way of which a torsion bar torque $MTB_{mess}$, measurable by way of the torque sensor 20, for example, is created as a function of the signal $M''_{servo}$ present at the input. A transfer function referred to as $G_{nom}(s)$ represents a model of the steering device 31, and thus of the actual transfer function $G_{real}(s)$.

This model $G_{nom}(s)$ serves as the basis for the ZSB+uS 25. The model, and thus the nominal transfer function $G_{nom}(s)$, however, deviate from the actual steering device 31, and thus from the transfer function $G_{real}(s)$ that is in fact implemented by the steering device 31. For example, such deviations arise from inaccuracies, errors and abstractions in the modeling process, and in particular as a result of production variances. Moreover, deviations between the actual controlled system and the modeled system can arise in that, during operation of the steering device 2, 31, disturbances occur within the steering device, for example (disturbing) vibrations that develop in the torque control element 7. The so-called modeling errors that exist as a whole between the actual controlled system and the model are shown as D(s) in FIG. 2. This correlation is shown schematically in the steering device 31 in that the actual transfer function $G_{real}(s)$ is represented as a combination of the model $G_{nom}(s)$ and of the modeling error D(s) or by superimposition of the respective output signals that are created.

The torsion bar torque $MTB_{mess}$ measured in the steering device 2, or at the output of the functional block 31 representing the steering device 2, is supplied as a signal to the disturbance variable and state calculator having an additional unstructured disturbance 25. Based on the nominal system model $G_{nom}(s)$, and as a function of the actuating torque $M'_{servo}$ as well as the measured torsion bar torque $MTB_{mess}$, the compensation signals $\underline{M}(f_{1o})$, $\underline{M}(f_{2o})$, ... $\underline{M}(f_{no})$ are ascertained. Here, the previously ascertained compensation signals $\underline{M}(f_{1o})$, $\underline{M}(f_{2o})$, $\underline{M}(f_{no})$, added to the signal $M_{servo}$ (see adder 23 in FIG. 2), are taken into consideration. As a result of this basically internal feedback, the compensation of the disturbance variables $\underline{M}(f_{1o})$, $\underline{M}(f_{2o})$, $\underline{M}(f_{no})$ is maintained, even if these disturbance variables are no longer present in the torsion bar torque $MTB_{mess}$ due to the compensation that took place.

The SZB+uS 25 calculates the disturbing signal $\underline{M}_{Stoer}$, which characterizes both external unstructured disturbances $M_{Stoer}$ and errors in the system model $G_{nom}(s)$. The state variable $\underline{MTB}_{mess}$ represents a reconstruction of the torsion bar torque $MTB_{mess}$, which is measured at the steering device 2, or at the output of the steering device represented as a functional block 31 in FIG. 2.

Figure 3:
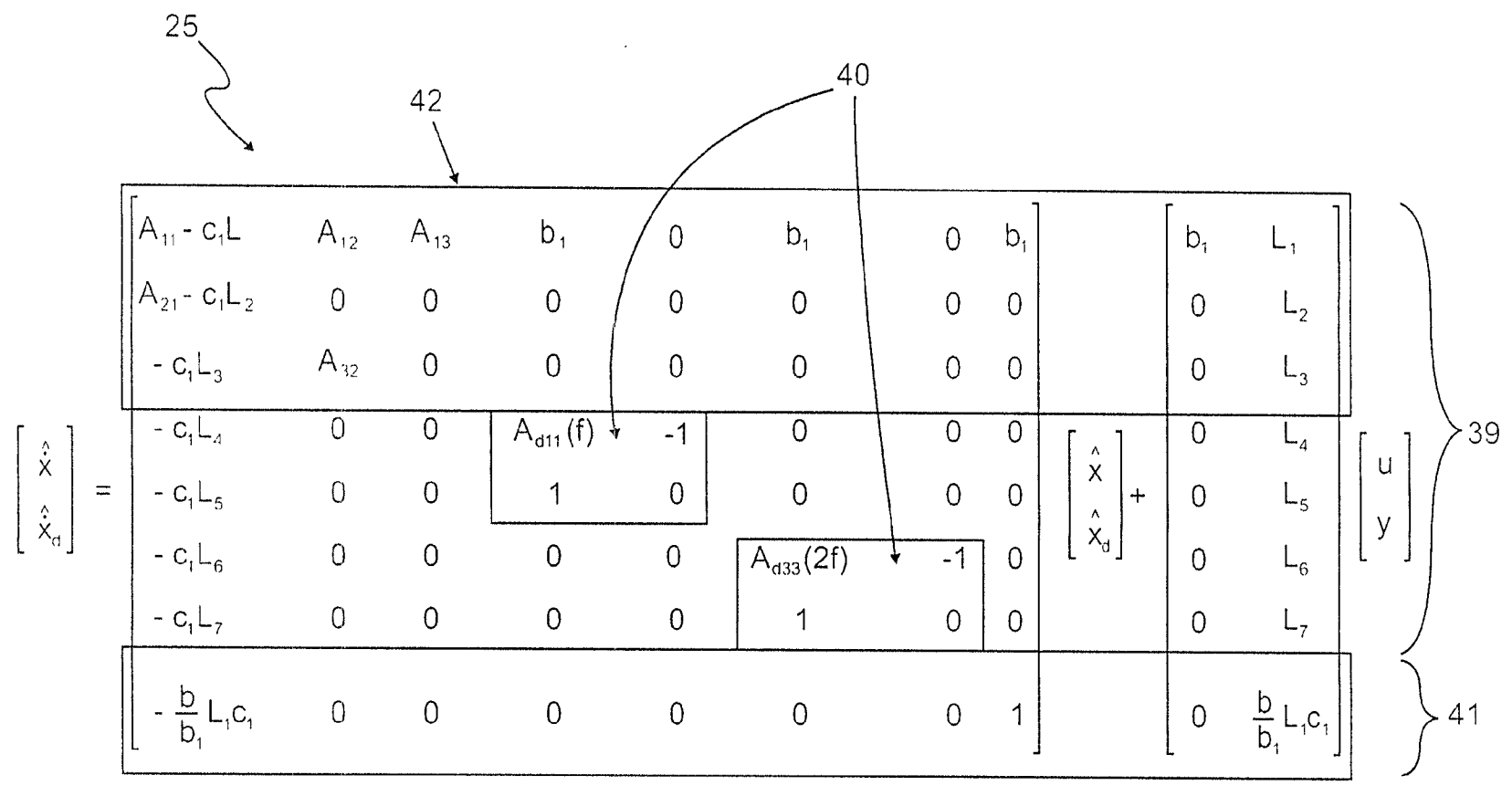

FIG. 3 shows a possible embodiment of the disturbance variable and state calculator having an additional unstructured disturbance 25, in the form of a differential equation. Each line of the differential equation corresponds to a state variable of the SZB+uS 25. The state variables that describe an internal system state of the steering device 2, 31 form a vector $\hat{x}$. State variables that correspond to disturbance variables form a vector $\hat{x}_d$.

The two vectors together form a state vector $[\hat{x}, \hat{x}_d]^t$ of the SZB+uS 25.

In the SZB+uS 25 shown by way of example in FIG. 3, the top three lines correspond to the internal states of the controlled system according to a steering model. The vector $\hat{x}$ thus has three components in this example. The bottom five lines correspond to the disturbance variables, wherein the bottommost line is used to determine the state variable $\underline{M}_{Stoer}$.

The top seven lines 39 thus form a part of the SZB+uS 25, which reconstructs the periodic disturbing signals or ascertains the compensation signals $\underline{M}(f_{1o})$, $\underline{M}(f_{2o})$, ... $\underline{M}(f_{no})$. Here, the areas 40 of the matrix shown on the left of FIG. 3 P13 are used to reconstruct the periodic, and in particular sinusoidal, disturbances $M(f_{1o})$, $M(f_{2o})$, ... $M(f_{no})$, and thus to create the compensation signals $\underline{M}(f_{1o})$, $\underline{M}(f_{2o})$, $\underline{M}(f_{no})$.

The bottommost line implements a prediction filter 41. The prediction filter 41 maps a deviation between the system states, predicted in the part 39 based on the system model $G_{nom}(s)$ with knowledge of the measured variable $MTB_{mess}$, and the currently estimated periodic disturbing signals, and thus the compensation signals $\underline{M}(f_{1o})$, $\underline{M}(f_{2o})$, ..., $\underline{M}(f_{no})$, onto the non-periodic disturbing signal $\underline{M}_{Stoer}$. The signal $\underline{M}_{Stoer}$ thus formed therefore includes all non-modeled disturbances, in particular the unstructured disturbances $\underline{M}_{Stoer}$ that occur in fact in the steering system or externally, as well as deviations that arise from inaccuracies of the model.

The SZB+uS 25 conducts measured variable tracking (see first column 42 of the matrix shown on the left of FIG. 3), which takes the compensation signals $\underline{M}(f_{1o})$, $\underline{M}(f_{2o})$, ..., $\underline{M}(f_{no})$ into consideration. The unstructured disturbances $M_{Stoer}$, which do not correlate with the periodic disturbing signals $\underline{M}(f_{1o})$, $\underline{M}(f_{2o})$, ... $\underline{M}(f_{no})$, are not mapped onto the periodic compensation signals $\underline{M}(f_{1o})$, $\underline{M}(f_{2o})$, ... $\underline{M}(f_{no})$, but onto the non-periodic disturbing signal $\underline{M}_{Stoer}$. Contrary to the method known from DE 10 2009 028 448 A1, the SZB+uS 25 does not require any preprocessing, and in particular no filtering, of the input variable $M_{servo}$.

The SZB+uS 25, and in particular the coefficients indicated in the matrices in the equation of FIG. 3, can be adapted to properties of the specific steering system 1 that is used in conjunction with the method. It may be provided that the dynamics of the SZB+uS 25 are deliberately applied to the individual states (measured value tracking; periodic, in particular sinusoidal, disturbances; unstructured disturbance) in keeping with the desired properties of the steering system 1 or its controller. In particular, the dynamics can be adapted to an excitation frequency, so that only low dynamics are present at low frequencies.

Figure 4:
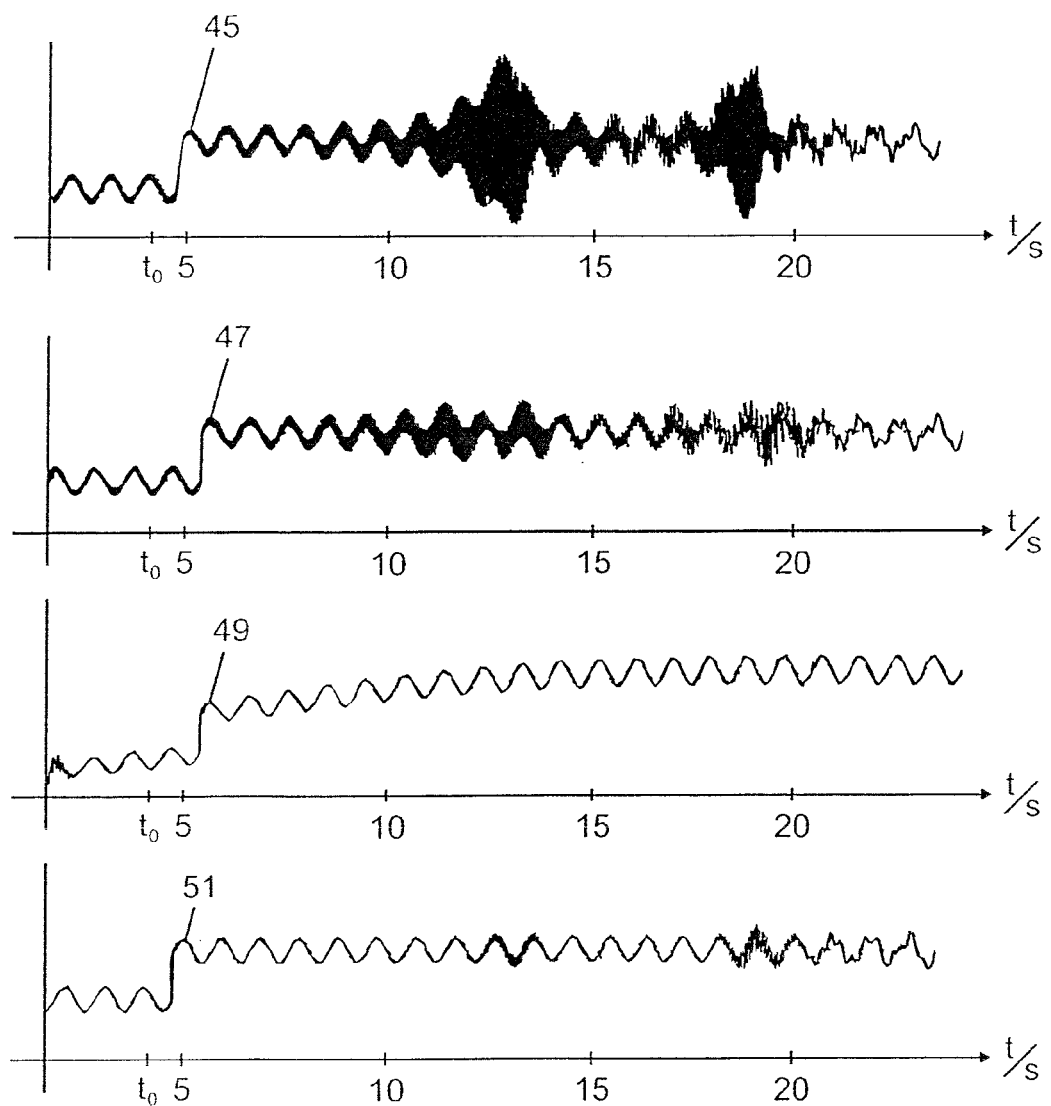
FIG. 4 shows multiple signal curves of a non-compensated signal and of signals compensated by way of various methods, which represent potential actuating signals of the torque control element by way of example.

The advantageous mode of operation of the method according to the invention (bottom diagram in FIG. 4) will be illustrated in comparison with other conceivable approaches based on FIG. 4. The diagrams shown in FIG. 4 show the curves of various signals on a common time axis t, some of the signals having been calculated by way of a simulator. The first (top) diagram shows a signal, such as a torsion bar torque $MTB_{mess}$, as it can typically occur in a steering device 2. This signal denoted by reference numeral 45 is shown in the first diagram without any compensation of disturbing variables. The signal 45 has the characteristic of a first-order and second-order brake judder signal in a frequency range of 25 Hz to 1 Hz. Moreover, a sinusoidal vibration of 1 Hz and a jump approximately at a point in time $t_0$=5 s are present in the signal 45. The 1 Hz sinusoidal vibration represents the low-dynamics steering behavior of a driver, and the jump shows the change in the signal curve caused by an action of the driver, which corresponds to an initiation of a steering motion or an evasive maneuver, for example.

The second diagram shows a compensated signal 47, which was determined by way of the method known from DE 10 2009 028 448 A1, which, however, was enhanced with order detection.

The third diagram shows a further compensated signal 49, in which a disturbance and state calculator was used, which is not designed to calculate the non-periodic disturbing signals, which means it has no state variable for the unstructured disturbance or for errors in the system model. It can be seen that the signal 49 has an offset, which is perceptible to the user of the steering system 1 in a constant moment at the torsion bar 9 or at the steering wheel 10, so that the driver here would have to apply a counter moment.

The bottom diagram shows a signal 51 that has been compensated by way of a method according to the invention. It can be seen that this signal has almost no disturbing signals any more, but only the jump at the point in time $t_0$ and the sinusoidal vibration of 1 Hz, which correspond to a simulated progression of a disturbance-free torsion bar torque (which is to say a torsion bar torque that, at most, has low torsional steering wheel vibrations).

Overall, the method described here allows disturbance variables to be compensated for, without the occurrence of an offset such as that caused by modeling inaccuracies, as is shown by way of example in the third diagram of FIG. 4 with the signal curve 49. Moreover, the present invention makes it possible, for the first time, to compensate for a plurality of simultaneously occurring sinusoidal disturbances, and in particular disturbances of any arbitrary orders and frequency mixtures having the properties described above. A preferred application option is the compensation of cold brake judder and hot brake judder. Moreover, the method can be easily adapted to the properties of the steering system 1 that is used in the specific case and to predetermined requirements in regard to the control of the steering system 1. Since no bandpass filter is required for the method according to the invention, the method can be carried out with relatively low computing complexity. And since modeling errors, together with the potentially occurring unstructured disturbances, are estimated in a variable $M_{Stoer}$, the method according to the invention overall is reliable and robust.

The invention claimed is:

1. A method for simultaneously compensating for a plurality of periodic disturbances ($M(f_{1o})$, $M(f_{2o})$, ... $M(f_{no})$), occurring during the operation of an electric steering device, the electric steering device comprising a torque control element, and at least one compensation signal ($\underline{M}(f_{1o})$, $\underline{M}(f_{2o})$, ... $\underline{M}(f_{no})$) corresponding to the disturbances ($M(f_{1o})$, $M(f_{2o})$, ... $M(f_{no})$) to be compensated for being determined as a function of a signal ($M_{servo}$) characterizing an actuating torque of the torque control element and a signal ($MTB_{mess}$) characterizing a current torsion bar torque, using a model ($G_{nom}(s)$) of the steering device wherein further disturbances $M_{Stoer}$, which occur in addition to the disturbances ($M(f_{1o})$, $M(f_{2o})$, ... $M(f_{no})$) that are to be compensated for, are mapped together with modeling errors (Δs) of the model ($G_{nom}(s)$) in the form of an unstructured disturbance ($\underline{M}_{Stoer}$).

2. The method according to claim 1, wherein the determination of the at least one compensation signal ($\underline{M}(f_{1o})$, $\underline{M}(f_{2o})$, ... $\underline{M}(f_{no})$) is made by way of a disturbance and state calculator having an additional unstructured disturbance "SZB+uS".

3. The method according to claim 2, wherein the disturbance and state calculator having an additional unstructured disturbance "SZB+uS" comprising a component for implementing measured variable tracking.

4. The method according to claim 2, wherein the disturbance and state calculator have an additional unstructured disturbance "SZB+uS" comprising at least one component for modeling the periodic disturbances ($M(f_{1o})$, $M(f_{2o})$, ... $M(f_{no})$), and the modeling result is used to create the respective compensation signal ($\underline{M}(f_{1o})$, $\underline{M}(f_{2o})$, ... $\underline{M}(f_{no})$).

5. The method according to claim 1, wherein the unstructured disturbance is ascertained by way of a prediction filter, and deviations between predicted system states, which are ascertained based on the model $G_{nom}(s)$ of the steering device, and a predicted system state, which is created as a function of the detected measured variable ($MTB_{mess}$) and currently estimated values for the disturbing mess, variables ($M(f_{1o})$, $M(f_{2o})$, ... $M(f_{no})$), are mapped onto the unstructured disturbance ($M_{Stoer}$).

6. The method according to claim 1, wherein the signal of the actuating torque ($M_{servo}$) is used to determine the compensation signal ($M(f_{no})$, $M(f_{2o})$, ... $M(f_{no})$) without modification by way of an additional filter, in particular a bandpass filter.

7. The method according to claim 1, wherein a compensation signal ($\underline{M}(f_{1o})$, $\underline{M}(f_{2o})$, ... $\underline{M}(f_{no})$) is created for each of the periodic disturbances ($M(f_{1o})$, $M(f_{2o})$, ... $M(f_{no})$) that occurs.

8. A device for simultaneously compensating for a plurality of periodic disturbances ($M(f_{1o})$, $M(f_{2o})$, $M(f_{no})$) occurring during the operation of an electric steering device, the electric steering device comprising a torque control element and at least one compensation signal ($\underline{M}(f_{1o})$, $\underline{M}(f_{2o})$, ... $\underline{M}(f_{no})$) corresponding to the disturbances ($M(f_{1o})$, $M(f_{2o})$, ... $M(f_{no})$) to be compensated for being determinable as a function of a signal ($M_{servo}$) characterizing an actuating torque of the torque control element and a signal ($MTB_{mess}$) characterizing a current torsion bar torque, using a model ($G_{nom}(s)$) of the steering device wherein the device comprises a calculation unit for determining the at least one compensation signal ($\underline{M}(f_{1o})$, $\underline{M}(f_{2o})$, ... $\underline{M}(f_{no})$), the calculation unit being designed so that further disturbances $M_{Stoer}$, which occur in addition to the disturbances ($M(f_{1o})$, $M(f_{2o})$, ... $M(f_{no})$) that are to be compensated for, are mapped together with modeling errors (Δs) of the model ($G_{nom}(s)$) in the form of an unstructured disturbance ($M_{Stoer}$).

9. A device comprising means for carrying out a method for simultaneously compensating for a plurality of periodic disturbances ($M(f_{1o})$, $M(f_{2o})$, ... $M(f_{no})$), occurring during the operation of an electric steering device, the electric steering device comprising a torque control element, and at least one compensation signal ($M(f_{1o})$, $M(f_{2o})$, ... $M(f_{no})$) corresponding to the disturbances ($M(f_{1o})$, $M(f_{2o})$, ... $M(f_{no})$) to be compensated for being determined as a function of a signal ($M_{servo}$) characterizing an actuating torque of the torque control element and a signal ($MTB_{mess}$) characterizing a current torsion bar torque, using a model $G_{nom}(s)$) of the steering device wherein further disturbances $M_{Stoer}$, which occur in addition to the disturbances ($M(f_{1o})$, $M(f_{2o})$, ... $M(f_{no})$) that are to be compensated for, are mapped together with modeling errors (Δs) of the model $G_{nom}(s)$) in the form of an unstructured disturbance ($M_{Stoer}$).

* * * * *